US009078154B2

(12) United States Patent
Nakamura et al.

(10) Patent No.: US 9,078,154 B2
(45) Date of Patent: Jul. 7, 2015

(54) TRANSMISSION DATA PROCESSING METHOD, INFORMATION PROCESSING METHOD, TRANSMISSION DEVICE, AND RECEPTION DEVICE

(75) Inventors: Kenichi Nakamura, Tokyo (JP); Seigo Nakao, Kanagawa (JP); Toyoki Ue, Kanagawa (JP); Ryohei Kimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 133 days.

(21) Appl. No.: 13/813,535

(22) PCT Filed: Feb. 22, 2012

(86) PCT No.: PCT/JP2012/001179
§ 371 (c)(1),
(2), (4) Date: Jan. 31, 2013

(87) PCT Pub. No.: WO2012/114728
PCT Pub. Date: Aug. 30, 2012

(65) Prior Publication Data
US 2013/0142045 A1 Jun. 6, 2013

(30) Foreign Application Priority Data
Feb. 25, 2011 (JP) ................................. 2011-040735
Aug. 4, 2011 (JP) ................................. 2011-171142

(51) Int. Cl.
*G01R 31/08* (2006.01)
*H04W 28/02* (2009.01)
(Continued)

(52) U.S. Cl.
CPC ....... *H04W 28/0289* (2013.01); *H04N 21/2381* (2013.01); *H04N 21/6112* (2013.01); *H04N 21/8456* (2013.01)

(58) Field of Classification Search
CPC ....... H04L 47/10; H04W 24/00; H04W 80/04
USPC .......................... 370/230, 252, 328, 338, 465
See application file for complete search history.

(56) References Cited

U.S. PATENT DOCUMENTS 6,721,338 B1 * 4/2004 Sato .............................. 370/508
6,891,799 B1 * 5/2005 Hagai et al. .................... 370/235
(Continued)

FOREIGN PATENT DOCUMENTS

JP  2004-128579 A   4/2004
JP  2005-341310 A   12/2005
(Continued)

OTHER PUBLICATIONS

Paramvir Bahl, et al., White Space Networking with Wi-Fi like Connectivity, Microsoft Research homepage, http://research.microsoft.com/apps/pubs/default.aspx?id=80952, Aug. 17-21, 2009.
(Continued)

*Primary Examiner* — Ricky Ngo
*Assistant Examiner* — Christine Ng
(74) *Attorney, Agent, or Firm* — Pearne & Gordon LLP

(57) ABSTRACT

Disclosed is a technique for providing a transmission data processing method and the like capable of estimating a communicable band in a heterogeneous multi-radio network at a higher speed and minimizing the deterioration of the video quality even if an unavoidable fluctuation occurs in a band available for transmission. According to the technique, there is provided a transmission data processing method at a stage prior to data transmission by a transmission device 100 for providing the data transmission to a reception device 200 as a communication partner, including: a priority giving step of giving priority to each data of multiple pieces of data, to be transmitted to the reception device, based on a predetermined criterion; a feedback receiving step of receiving, from the reception device, feedback information on data transmitted from the transmission device to the reception device; and a distribution step of distributing, based on the priority and the feedback information received, the multiple pieces of data into a first interface and a second interface used for communication with the reception device.

3 Claims, 14 Drawing Sheets

(51) Int. Cl.
*H04N 21/2381* (2011.01)
*H04N 21/61* (2011.01)
*H04N 21/845* (2011.01)

(56) References Cited

U.S. PATENT DOCUMENTS

| | | |
|---|---|---|
| 2002/0097727 A1* | 7/2002 | Prakash .................. 370/395.42 |
| 2003/0118107 A1* | 6/2003 | Itakura et al. ............ 375/240.19 |
| 2005/0213538 A1 | 9/2005 | Ebiko et al. |
| 2006/0114989 A1* | 6/2006 | Panda ..................... 375/240.03 |
| 2007/0008978 A1* | 1/2007 | Pirzada et al. ........... 370/395.43 |
| 2007/0097877 A1 | 5/2007 | Hoekstra et al. |
| 2009/0019505 A1* | 1/2009 | Gopalakrishnan et al. ... 725/109 |
| 2009/0129274 A1 | 5/2009 | Guillouard et al. |
| 2011/0035034 A1* | 2/2011 | Gupta et al. ..................... 700/94 |
| 2011/0235650 A1* | 9/2011 | Martinez et al. ............... 370/419 |

FOREIGN PATENT DOCUMENTS

| | | |
|---|---|---|
| JP | 2009-508374 A | 2/2009 |
| JP | 2009-515433 A | 4/2009 |

OTHER PUBLICATIONS

International Search Report for PCT/JP2012/001179 dated May 29, 2012.

\* cited by examiner

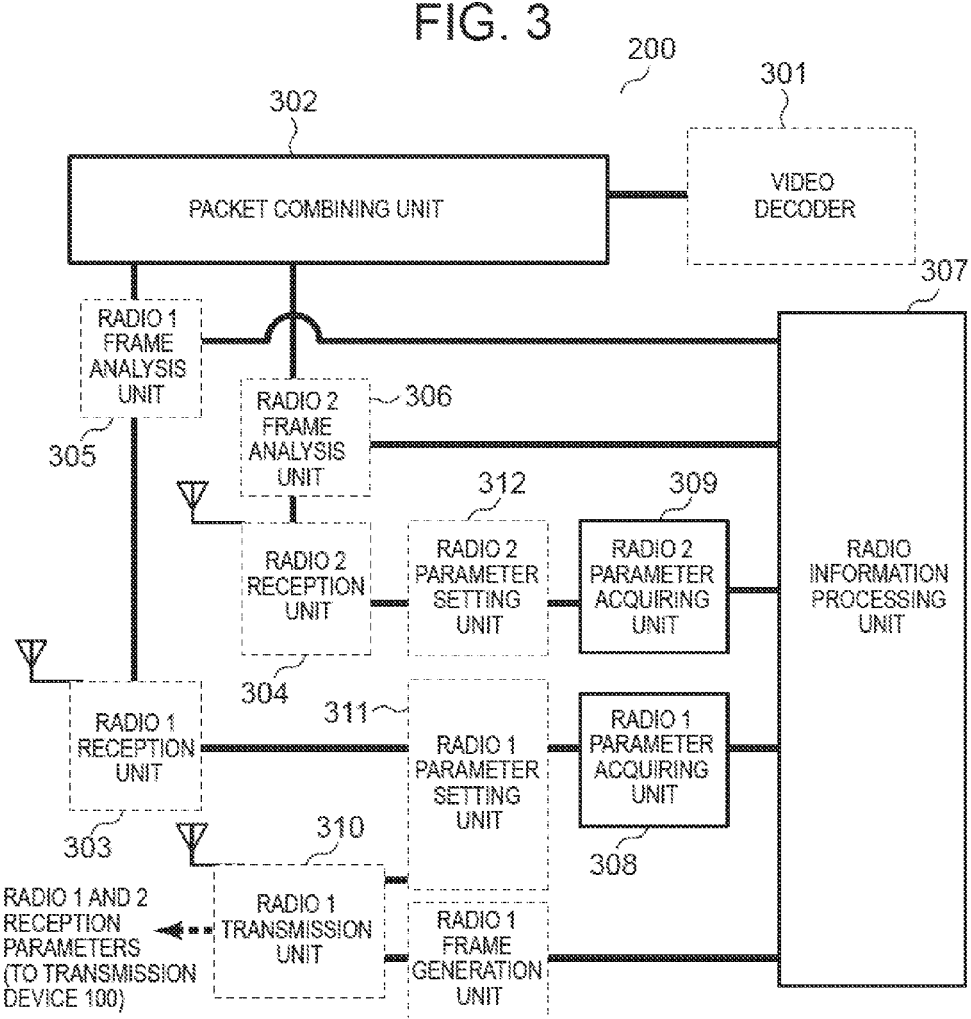

FIG. 4B

| TYPE | CONTENTS | NUMBER OF UNITS | DATA SIZE | PRIORITY |
|---|---|---|---|---|
| SPS | SEQUENCE INFORMATION | 24 | 16 | 1 |
| PPS | PICTURE INFORMATION | 24 | 16 | 1 |
| IDR SLICE | I SLICE CAPABLE OF STARTING PLAYBACK (QVGA) | 8 | 20000 | 1 |
| | I SLICE CAPABLE OF STARTING PLAYBACK (HD) | 24 | 120000 | 2 |
| I SLICE | SLICE WITHOUT INTER-FRAME ESTIMATION | 100 | 120000 | 3 |
| P SLICE | SLICE USING INTER-FRAME ESTIMATION | 200 | 50000 | 4 |

FIG. 5A

| DATA ACQUISITION LAYER | PARAMETER | VALUE |
|---|---|---|
| LINK LAYER VIDEO TRANSMISSION SIDE 1 (e.g.: LTE) | MCS | 0 (QPSK) |
| | NUMBER OF PRBs | 8 (202bit) |

FIG. 5B

| DATA ACQUISITION LAYER | PARAMETER | VALUE |
|---|---|---|
| LINK LAYER VIDEO TRANSMISSION SIDE 2 (e.g.: Wi-Fi) | BIT RATE | 55mpbs |
| | NAV VALUE | 15ms |

FIG. 6A

| DATA ACQUISITION LAYER | PARAMETER | VALUE |
|---|---|---|
| TRANSPORT LAYER VIDEO RECEPTION SIDE (e.g.: LTE) | RECEPTION BIT RATE | 300kbps |
| | AMOUNT OF DELAY | 90ms |

FIG. 6B

| DATA ACQUISITION LAYER | PARAMETER | VALUE |
|---|---|---|
| TRANSPORT LAYER VIDEO RECEPTION SIDE 2 (e.g.: Wi-Fi) | RECEPTION BIT RATE | 4000kbps |
| | AMOUNT OF DELAY | 300ms |

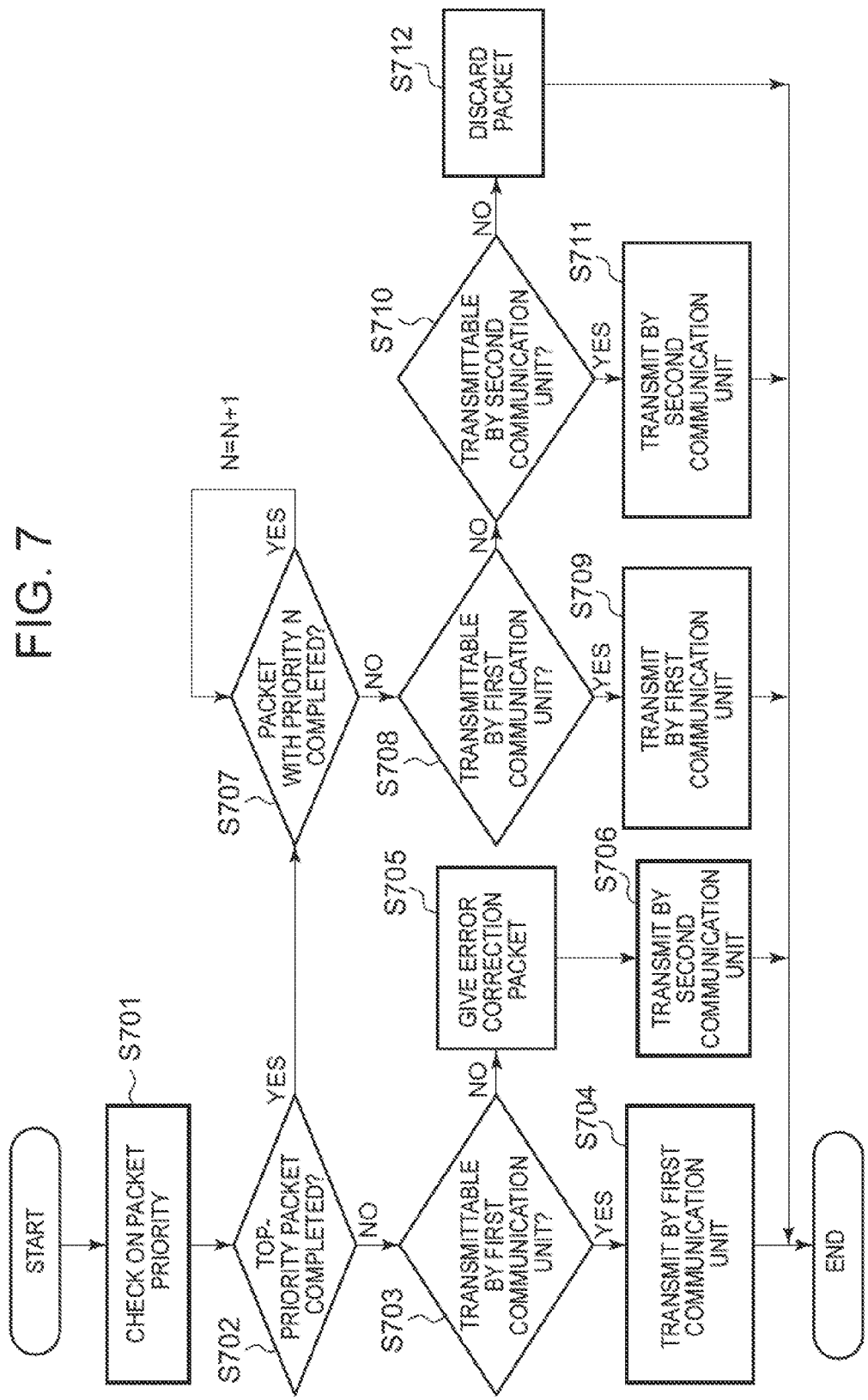

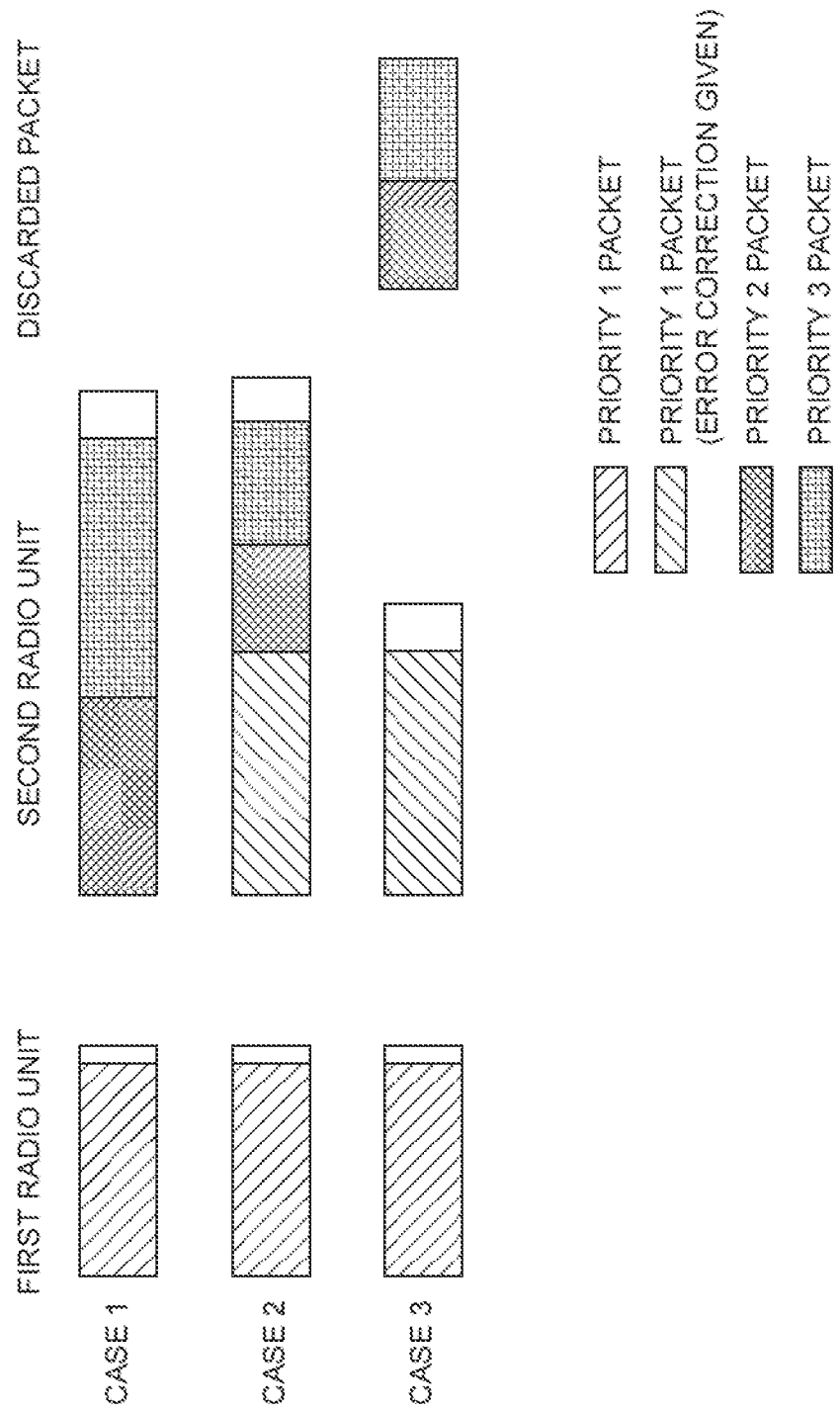

| Option Type 7 | Length | Pointer | Route Data |
|---|---|---|---|

● DEFINITION OF EACH FIELD
  ● Option Type: SPECIFY OPTION FORMAT (7 IN CASE OF Record Route)
  ● Length: NUMBER OF Octets RECORDABLE IN Route Data
  ● Pointer: SPECIFY Octet INDICATIVE OF ADDRESS RECORDED NEXT
  ● Route Data: RECORDING AREA OF IP ADDRESS PASSED THROUGH

| Option Type 131 | Length | Pointer | Route Data |

● DEFINITION OF EACH FIELD
 ● Option Type: SPECIFY OPTION FORMAT (131 IN CASE OF LSRR)
 ● Length: NUMBER OF Octets IN Route Data
 ● Pointer: SPECIFY Octet INDICATIVE OF ADDRESS OF NEXT ROUTING DESTINATION
 ● Route Data: ROUTE DISPLAY OF ADDRESS TO BE SPECIFIED

TRANSMISSION DATA PROCESSING METHOD, INFORMATION PROCESSING METHOD, TRANSMISSION DEVICE, AND RECEPTION DEVICE

TECHNICAL FIELD

The present invention relates to a transmission data processing method, an information processing method, a transmission device, and a reception device upon transmitting and receiving data using a network where the available band varies with time or location.

BACKGROUND ART

With the digitalization of broadcasting, effective use of so-called TV white space, which allows secondary use of radio resources unused by primary users (broadcast, microphone, and the like) in a frequency band allocated for broadcasting use, is attracting attention. On the other hand, with the explosive growth of netbooks, portable AV players, tablet PCs, and the like, users using Wi-Fi (wireless LAN) are increasing. Further, the emergence of portable Wi-Fi routers or Wi-Fi smart phones results in an exponential increase in the number of Wi-Fi access points. Thus, the depletion of frequencies available for Wi-Fi use is expected.

Therefore, use of Wi-Fi technology in a frequency band opened up in TV white space to solve this Wi-Fi frequency depletion problem is under consideration (see FIG. 19 and Non-Patent Document 1 cited below). However, this band is 6-8 MHz, which is narrower than the bandwidths (22 MHz, 20/40 MHz) for conventional Wi-Fi use, and the scheme is that several to tens of users share radio waves. Therefore, if the number of users or the amount of information transmitted per unit user is large, the available band will be restricted.

Thus, an attempt to secure a wide band in such a scheme that multiple bandwidths in the same frequency band are aggregated or aggregated with a heterogeneous radio band (heterogeneous multi-radio network) has been made to transmit and receive large volumes of data smoothly like in video transmission using a Wi-Fi network where the available band is restricted. As schemes for transmitting packets in this heterogeneous multi-radio network, various schemes have been considered, such as to distribute the packets into two radios based on the throughput or the amount of delay measured on the receiver side, or to separately use a lower radio depending on the characteristics of an application.

PRIOR ART DOCUMENTS

Non-Patent Document

Non-patent Document 1: Microsoft Research homepage, http://research.microsoft.com/apps/pubs/default.aspx?id=80952

SUMMARY OF THE INVENTION

However, when a packet distribution system in a conventional heterogeneous multi-radio network is used for an application requiring broadband, low-delay, and high-quality communication such as high-resolution live video transmission, the capability of tracking a network fluctuation is poor because of a delay in the feedback of a network situation due to the instability of the Wi-Fi network band and the magnitude of the delay. Therefore, congestion can occur on any node in the network to impair the video quality unless the transmission bit rate of a video stream is set by underestimating a band available for transmission.

As another factor in reducing the video quality in the case of the shortage of throughputs, there is a case where packet loss occurs when a throughput shortage occurs due to uniform transmission of all packets that have a video stream. Particularly, in a low-delay live video transmission service, the packets are often handled as datagrams to minimize the amount of network delay, and the lost packets are not retransmitted. If packets necessary to play back the video cannot be received, the video may not be able to be played back for a certain period as well as reduction in the video quality.

The present invention has been made in view of the above problems, and it is an object thereof to provide a transmission data processing method, an information processing method, a transmission device, and a reception device capable of estimating a communicable band in a heterogeneous multi-radio network at a higher speed and reducing the deterioration of the video quality even if an unavoidable fluctuation occurs in the communicable band.

In order to attain the above object, according to the present invention, there is provided a transmission data processing method at a stage prior to data transmission by a transmission device for providing the data transmission to a reception device as a communication partner, including: a priority giving step of giving priority to each data of multiple pieces of data, to be transmitted to the reception device, based on a predetermined criterion; a feedback receiving step of receiving, from the reception device, feedback information on data transmitted from the transmission device to the reception device; and a distribution step of distributing, based on the priority and the feedback information received, the multiple pieces of data into a first interface and a second interface used for communication with the reception device. According to this structure, an estimation of a communicable band in a heterogeneous multi-radio network can be made at a higher speed, and the deterioration of the video quality can be reduced even if an unavoidable fluctuation occurs in the communicable band.

According to the present invention, there is also provided an information processing method for a reception device receiving data from a transmission device as a communication partner to transmit information to the transmission device, including: a reception step of using a radio communication unit composed of a first interface and a second interface used for communication with the transmission device to receive the data from the transmission device; a feedback acquisition step of acquiring feedback information on the data based on the received data; and a transmission step of transmitting the acquired feedback information to the transmission device through the first interface. According to this structure, an estimation of a communicable band in a heterogeneous multi-radio network can be made at a higher speed, and the deterioration of the video quality can be reduced even if an unavoidable fluctuation occurs in the communicable band.

According to the present invention, there is further provided a transmission device for providing data transmission to a reception device as a communication partner, including: a radio communication unit composed of a first interface and a second interface used for communication with the reception device; a transmission unit for using the radio communication unit to transmit multiple pieces of data to the reception device; a priority giving unit for giving priority based on a predetermined criterion to each piece of the data to be transmitted to the reception device through the transmission unit;

a feedback receiving unit for receiving, from the reception device, feedback information on data transmitted from the transmission device to the reception device; and a distribution unit for distributing the multiple pieces of data, to be transmitted through the transmission unit, into the first interface and the second interface based on the priority and the feedback information received. According to this structure, an estimation of a communicable band in a heterogeneous multi-radio network can be made at a higher speed, and the deterioration of the video quality can be reduced even if an unavoidable fluctuation occurs in the communicable band.

Further, according to the present invention, there is provided a reception device for receiving data from a transmission device as a communication partner, including: a radio communication unit composed of a first interface and a second interface used for communication with the transmission device; a reception unit for using the radio communication unit to receive the data from the transmission device; a feedback acquisition unit for acquiring feedback information on the data based on the received data; and a transmission unit for transmitting the acquired feedback information to the transmission device through the first interface. According to this structure, an estimation of a communicable band in a heterogeneous multi-radio network can be made at a higher speed, and the deterioration of the video quality can be reduced even if an unavoidable fluctuation occurs in the communicable band.

The transmission data processing method, the information processing method, the transmission device, and the reception device of the present invention can estimate a communicable band in a heterogeneous multi-radio network at a higher speed and reduce the deterioration of the video quality even if an unavoidable fluctuation occurs in the communicable band.

BRIEF DESCRIPTION OF THE DRAWINGS

FIG. 3 is a block diagram showing an example of the structure of a reception device according to the embodiments of the present invention.

FIG. 4A is a diagram showing an example of criteria for judging the communication quality of interfaces according to an embodiment of the present invention.

FIG. 4B is a diagram showing an example of giving priority when MPEG-4 Part 10 (H.264) is employed in the embodiment of the present invention.

FIG. 5A is a diagram showing an example of acquisition/transmission parameters of LTE in the embodiment of the present invention.

FIG. 5B is a diagram showing an example of acquisition/transmission parameters of IEEE802.11 in the embodiment of the present invention.

FIG. 6A is a diagram showing a case where a communicable band and the amount of delay of LTE are estimated in the embodiment of the present invention.

FIG. 6B is a diagram showing a case where a communicable band and the amount of delay of IEEE802.11 are estimated in the embodiment of the present invention.

FIG. 7 is a flowchart showing an example of an operational flow of the transmission device according to the embodiments of the present invention.

FIG. 8 is a diagram showing an example of allocation of packets in the embodiments of the present invention.

DESCRIPTION OF EMBODIMENTS

First Embodiment

Figure 1:
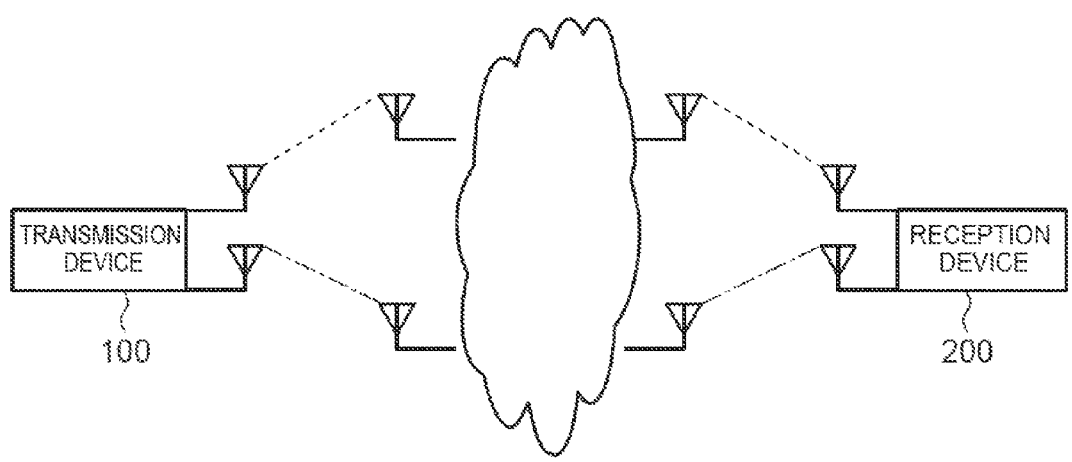
FIG. 1 is a diagram showing an example of the structure of a communication system according to embodiments of the present invention.

First, an outline of a communication system of the present invention will be described. As shown in FIG. 1, the communication system is composed of a transmission device 100 and a reception device 200. The transmission device 100 and the reception device 200 are connected wirelessly by using a first interface and a second interface. Here, the first interface and the second interface are radio communication units different in characteristics, where the first interface possesses higher reliability. In other words, the first interface has a higher communication quality than the second interface. An example of criteria for judging the communication quality of interfaces is shown in FIG. 4A.

Both of the transmission device 100 and the reception device 200 have the functions of measuring the communication situations of the first interface and the second interface (such as the actual communication bit rate, the amount of delay, etc.), respectively. The reception device 200 has the function of feeding back the communication situation to the transmission device 100.

Figure 2:
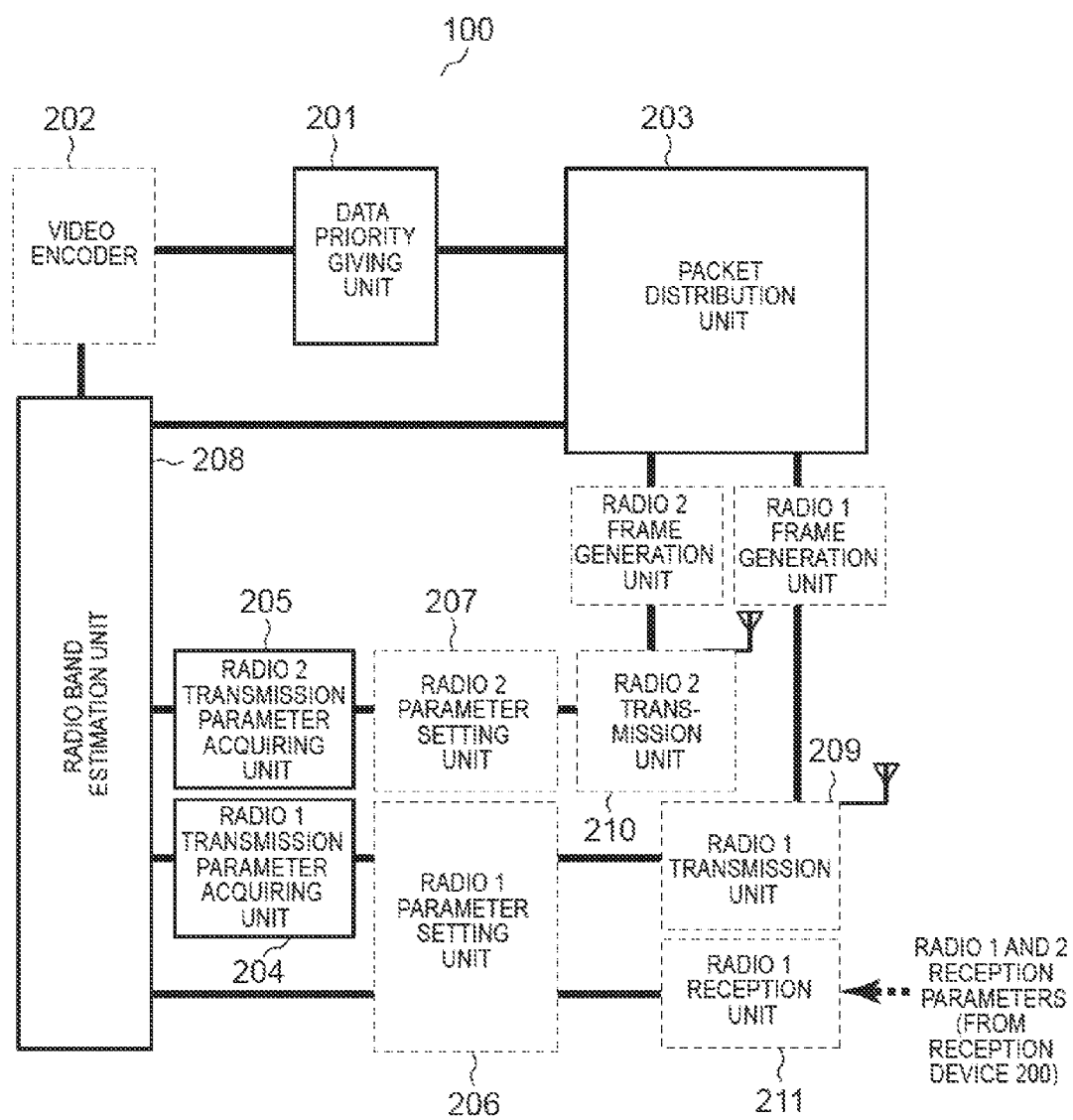
FIG. 2 is a block diagram showing an example of the structure of a transmission device according to the embodiments of the present invention.

Next, an example of the structure of the above transmission device 100 will be described. FIG. 2 is a block diagram of the transmission device 100 according to embodiments of the present invention. A data priority giving unit 201 analyzes a video packet group acquired from a video encoder 202, gives priority to be described later, and sends the video packet group to a packet distribution unit 203. A radio 1 transmission parameter acquiring unit 204 of the first interface and a radio 2 transmission parameter acquiring unit 205 of the second interface acquire parameters for estimating a communicable band in each radio unit, such as the modulation method, the frame length, and the degree of network congestion, from a radio 1 parameter setting unit 206 of the first interface and a radio 2 parameter setting unit 207 of the second interface, respectively. In other words, the transmission device further has communication parameter acquiring units to acquire communication parameters on the first interface and the second interface, and a packet distribution unit further uses communicable band information estimated in a radio band estimation unit to be described later to distribute multiple pieces of data (multiple packets). Here, the communicable band means the total number of bits communicable through a certain communication interface per unit time. If the amount of packet distribution in the distribution unit to be described later can be set based on header information as overhead and information such as a communication prohibition period, information of any communication layer may be used. For example, when a radio parameter is used to estimate a communicable band, an estimation is made in such a manner that the amount of overhead of a higher layer is reflected in information measured in a physical layer or a MAC layer. Further, when the communicable band of the entire system from the transmission device to the reception device measured by using test packets, the communicable band of an IP layer can be estimated.

A radio band estimation unit 208 transmits, to the packet distribution unit 203, the amounts of packet data to be assigned to the first interface and the second interface from the communication parameters acquired from the radio 1 transmission parameter acquiring unit 204 of the first interface and the radio 2 transmission parameter acquiring unit 205 of the second interface, and received parameters of the first interface and the second interface acquired on the reception device 200 side via the first interface. The radio band estimation unit 208 also feeds back total communicable band information on the first interface and the second interface to the video encoder 202 to enable a change in target value for the bit rate of video encoding. In other words, the transmission device further has an estimation unit for estimating, based on the feedback information, a communicable band associated with communication with the reception device, and the distribution unit distributes multiple pieces of data based on the estimation results of the estimation unit.

Then, based on the communicable band information on the first interface and the second interface acquired from the radio band estimation unit 208, the packet distribution unit 203 distributes the multiple pieces of data into the first interface and the second interface according to the priority given in the data priority giving unit 201. In other words, the distribution unit distributes data into the first interface and the second interface based on the priority given to the data. A specific distributing method will be described later. The first and second interfaces transmit not only video packets divided up in the packet distribution unit 203, but also test packets arbitrarily to measure actual communication parameters through the reception device 200.

Figure 10:
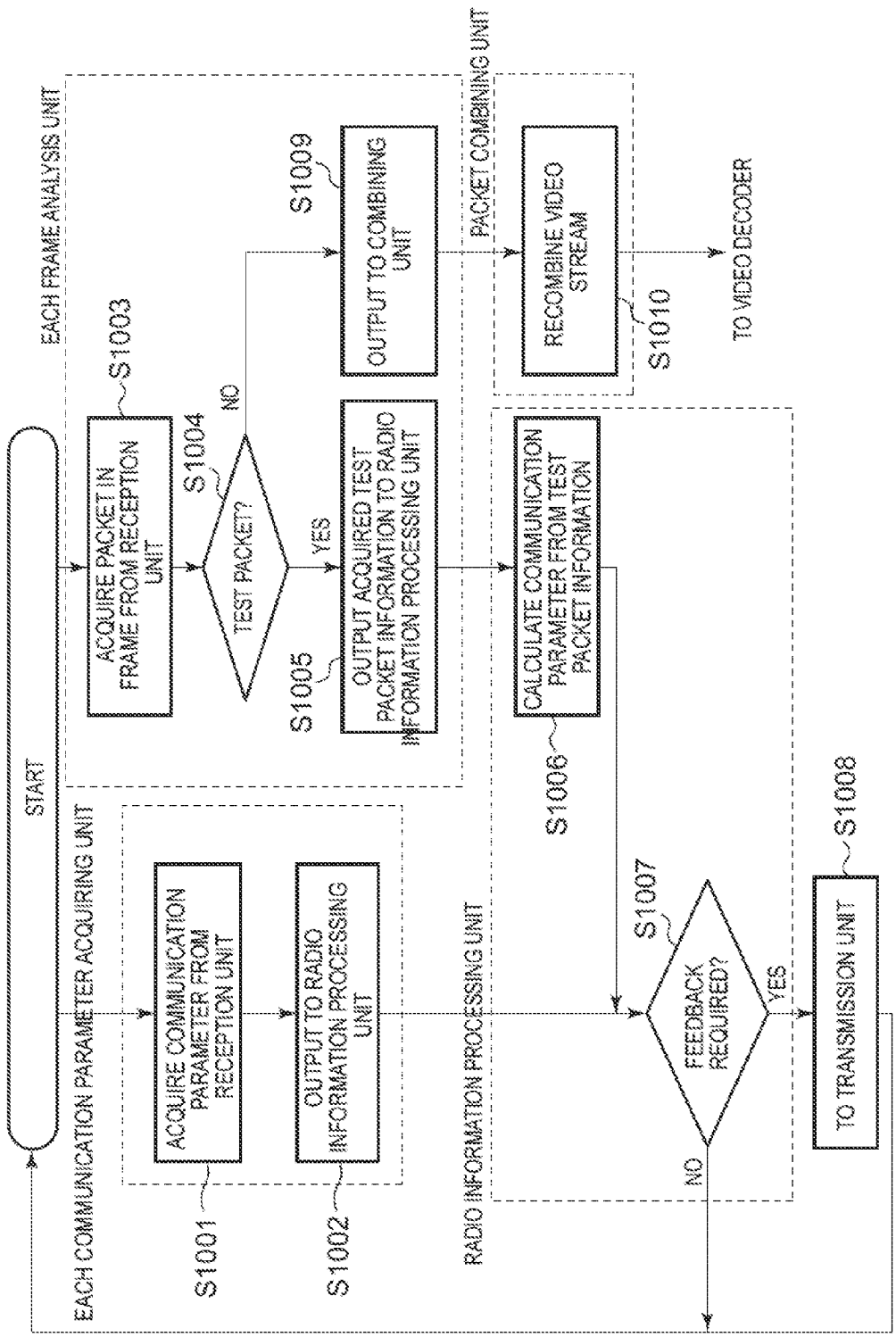
FIG. 10 is a flowchart showing an example of an operational flow of the reception device according to the embodiments of the present invention.

Next, an example of the structure of the above reception device 200 will be described with reference to FIG. 3 and FIG. 10. FIG. 3 is a block diagram showing the structure of the reception device 200 according to the embodiments of the present invention. FIG. 10 is a flowchart showing an example of the operation of the reception device 200 according to the embodiments of the present invention. The reception device 200 can recombine, as one video stream data, the packets divided up into the first interface and the second interface and transmitted from the transmission device 100, output the video stream data to a video decoder 301, and feed back a communication situation on the reception device 200 side to the transmission device 100.

A radio 1 parameter acquiring unit 308 and a radio 2 parameter acquiring unit 309 acquire communication parameters on the first interface and the second interface on the reception device 200 side from a radio 1 reception unit 303 and a radio 2 reception unit 304 (step S1001), and transmits the communication parameters to a radio information processing unit 307 (step S1002). Each of frame analysis units (a radio 1 frame analysis unit 305 and a radio 2 frame analysis unit 306) acquires, from the reception unit, a packet stored in a frame (step S1003). Each frame analysis unit determines whether the acquired packet is a test packet, and when it is a test packet (Yes in step S1004), the frame analysis unit outputs the acquired test packet information to the radio information processing unit 307 (step S1005).

Next, the radio information processing unit 307 calculates communication parameters for estimating a band available for transmission, the amount of delay, and the like, from the test packet information (step S1006). When feedback is required (YES in step S1007), the radio information processing unit 307 determines a parameter useful for image quality control from the communication parameters acquired from the packet combining unit 302, and the radio 1 reception unit 303 and the radio 2 reception unit 304 of the first interface and the second interface, and gives feedback to the transmission device 100 from a radio 1 transmission unit 310 as the transmission unit of the first interface (step S1008). On the other hand, when each frame analysis unit determines that the packet is not a test packet (No in step S1004), the packet combining unit 302 recombines the video packets acquired from the radio 1 reception unit 303 and the radio 2 reception unit 304 of the first interface and the second interface, and outputs the video packets to the video decoder 301 as video stream data (step S1009 and step S1010).

Next, the specific operation of the transmission device 100 will be described.

In Re Giving Data Priority

The data priority means that the necessity of the data used at the destination upon execution of an application is indicated with an objective index. For example, when a temperature change is detected using sensor information through a network, data when there is a temperature change is essential for finding out the amount of change. However, when there is no temperature change, it is only necessary to find out the fact that there is no change, and individual data is not necessarily indispensable. In this case, data when there is a temperature change can be defined to be given higher priority than data when there is no temperature change.

In the case of a video stream like in the embodiment of the present invention, packets that have the video stream are roughly classified into three kinds of packet types. The first packet type consists of a parameter group indicative of a video sequence representing the structure of the video stream and video encoding conditions. If these packets are lost, the video may not be able to be played back at all until the next parameter group is received. Further, the video cannot be played back unless the first packet type arrives before the arrival of video data. The second packet type consists of packets each of which alone can reproduce at least one picture. The second packet type corresponds to intra-frame compression coded data called I frame in MPEG-2, MPEG-4, and MPEG-4 Part 10 (also called H.264) used for digital broadcasting, video conferencing, or the like. When this second packet type is lost, since the third packet type to be described below cannot be reproduced, the video may not be able to be played back at all until the next second packet type arrives. The third packet type consists of packets each of which alone cannot reproduce any picture and is composed of a difference value and the like calculated by referring to the I frame. The third packet type corresponds to inter-frame compression coded data called P frame or B frame in MPEG-2. MPEG-4, and MPEG-4 Part 10.

Even in each packet type, priority can further be subdivided. For example, in the second packet type, when data in the I frame can be divided into a core portion for composing a low-resolution picture and an expanded component for composing a high-resolution picture in addition to the core portion, if higher priority is given to the core portion, the video can be played back without any break though the resolution is coarse. Further, in the second packet type, if higher priority is given to data in a frame with a large difference value from the picture at the destination to which it is referred, the distortion of video can be reduced even though the amount of data is the same. In order to transmit video without any break, transmission must be provided without losing at least the first packet type and part of the second packet type. Thus, there is a need to give a certain level of priority or more to these packet types. In other words, the priority giving unit gives priority depending on the degree of necessity of data.

In the data priority giving unit 201, value information indicative of a certain level of priority or more is given, for example, as header information or an additional bit to enable the packet distribution unit 203 to determine whether to distribute the packet into the first interface or the second interface.

FIG. 4B shows an example of giving priority when MPEG-4 Part 10 (H.264) is employed. In this case, packets with priority "1" are delivered without fail via the first interface so that the QVGA level of video can be played back at the very least even if the radio wave conditions are made worse. Further, if the radio wave conditions is so recovered that packets with priority "2" or less can be transmitted, the video will approach HD-level, high-resolution smooth video as the amount of packets available for transmission increases. For example, when there is a band for the first interface to such a degree that a small-screen size of video can be transmitted, data to which the highest priority is given by the priority giving unit upon giving priority are at least parameters indicative of a video sequence, parameters indicative of video encoding conditions, and intra-frame compression coded data. On the other hand, if there is no band to such a degree that the small-screen size of video can be transmitted, data to which the highest priority is given by the priority giving unit upon giving priority are at least parameters indicative of a video sequence and parameters indicative of video encoding conditions.

In Re Acquisition of Communication Parameters on Transmission Device Side

The parameter for estimating a situation of data transmission by radio varies depending on the communication system, and the definition thereof cannot be generalized. However, if the communication system is known, an appropriate parameter can be specified from parameters used in the communication system to estimate a communicable band and the packet loss rate at the time.

For example, in the case of a cellular radio system called LTE (Long Term Evolution), a communicable band of a physical layer can be approximately estimated from a parameter called MCS (Modulation and Coding Scheme) specified by a base station and a parameter called PRB (Physical Resource Block). In other words, a parameter indicative of a modulation system and a code rate system in the current communication situation is acquired based on the MCS information sent from the base station side that controls the radio link, and frequency band information assigned based on the PRB information is acquired so that a band available for transmission from an own terminal can be estimated from these pieces of information. On the other hand, in the case of a Wi-Fi system, a combination of a parameter called a NAV (Network Allocation Vector) value defined in the IEEE802.11 specifications and information on the method (a/b/g/n), the band (20 MHz/40 MHz), and the like can lead to approximate estimation of the bit rate. In other words, based on an ideal bit rate of the radio link, the channel occupancy of the own terminal can be determined from a transmission prohibition period and a period available for transmission from the own terminal to estimate a band available for transmission from the own terminal.

The radio 1 and radio 2 parameter acquiring units 308 and 309 of the first and second interfaces acquire communication parameters necessary to estimate the band available for transmission in the communication system from the radio 1 and radio 2 parameter setting units 311 and 312. At this time, when there is no scheme for notifying the radio 1 and radio 2 parameter acquiring units 308 and 309 of changes each time the communication parameters are changed in the radio 1 and radio 2 parameter setting units 311 and 312, the radio 1 and radio 2 parameter acquiring units 308 and 309 may make requests to the radio 1 and radio 2 parameter setting units 311 and 312 for the latest communication parameters. FIG. 5A and FIG. 5B show examples of acquisition/transmission parameters of LTE and IEEE802.11 as one example of the present invention.

In Re Acquisition of Communication Parameters on Reception Device Side

Communication parameters acquirable on the reception device 200 side are two kinds of parameters, i.e., communication parameters acquirable from packets added to a video stream for the purpose of measuring the communication parameters and communication parameters acquirable by the same method as those for transmission parameters from the radio 1 and radio 2 reception units 303 and 304 as the radio reception units. As methods of estimating a communicable band from the communication parameters, there are some methods such as a method using packet pairs and a method using packets having a constant length. Here, though the method is not specified, parameters according to the respective methods need to be set as communication parameters for estimating a communicable band.

For example, the method using packet pairs is to transmit two pairs of two test packets from the transmission device 100 side and measure a change in reception interval on the reception device 200 side in order to check on a change in the communicable band. In this case, the reception intervals of the test packets become parameters necessary to estimate a communicable band. At this time, if Acknowledge indicating that the reception device 200 side received data correctly is sent as a reply to the test packets, the transmission device 100 side can use the interval difference to measure a band. In this case, however, the estimation error will become large if the reliability of radio is low.

Like in the present invention, if reception interval data is sent as a replay by using the first interface highly reliable with small delay, the influence such as the loss of data or transmission fluctuation in the uplink can be ignored, and this can lead to highly accurate band estimation by comparing the reception interval data with transmission interval data grasped by the transmission device 100. Further, as a way of measuring the amount of network delay and the packet loss rate, use of ping in an IP network is a leading method. This is to use such a configuration that, when an Echo Request is transmitted from the transmission device 100 side, an Echo Reply is returned from the reception device 200 side to estimate RTT (Round Trip Time) or the packet loss rate from the time until the Reply is returned and the response rate. At this time, in the case of using radio systems different in characteristics like in the present invention, if an Echo Reply to each Echo Request is transmitted using the second interface having low reliability and large delay, there will be a possibility of a large error in calculating the amount of one-way delay from the RTT value or the loss of packets in both the uplink and the downlink. This results in the occurrence of a large error in the packet loss rate of the downlink to be originally measured.

Therefore, the amount of difference in Echo Request arrival time between the first interface and the second interface is fed back, rather than that the Echo Reply is returned from the second interface. Then, after the amount of delay on the highly reliable first interface is calculated from RTT, the amount of difference in arrival time is added so that the amount of delay on the second interface can be estimated more accurately. Further, after the Echo Request is received on the first interface, if the second interface receives no Echo Request for a given length of time, information on the number of times of no reception can be fed back to estimate the packet loss rate of the second interface more accurately.

As information fed back from the reception device to the transmission device, if at least the communication parameter for estimating a communicable band of the first interface and the amount of delay on the second interface can be found out, it will be effective in preventing the deterioration of the video playback quality. In other words, the feedback receiving unit receives, as feedback information transmitted from the reception device side, at least the parameter for estimating a receivable band of the first interface and the parameter for estimating the amount of delay on the second interface. The former is required to estimate a band necessary to send packets essential for playback. Even if an enormous volume of data is sent using the second interface, the arrival time of the last packet will be late, and hence there is a possibility that the delivered packets cannot be used for playback due to undelivered packets or the loss of packets caused by overflow of a buffer on the reception device side. Therefore, it would be better to discard data that cannot be sent within a range of delay amounts allowed by the network (e.g., when video is sent at 30 frames per second, if data for ten frames is allowable, up to 300 milliseconds after data arrival on the first interface). The latter is also required to make this determination.

In Re Estimation of Communicable Band

The radio band estimation unit 208 of the transmission device 100 estimates a communicable band using the communication parameter group sent from the reception device 200 to be necessary for band estimation, e.g., communicable bands, the amounts of delay, and the packet loss rates of two radio systems, respectively, from interval information on packet pairs, the Echo Request and the amount of difference, the presence or absence of receiving the Echo Request, etc. In other words, the feedback receiving unit receives, from the reception device, parameters related to the communicable band, the packet loss rate, and the delay. FIG. 6A and FIG. 6B show a case where the communicable bands and the amounts of delay of LTE and IEEE802.11 are estimated as one example of the present invention.

However, these pieces of data change from moment to moment along with changes in radio situation. Particularly, in the case of an LTE or HSPA (High Speed Packet Access) system, the communicable band for uplink often becomes narrow. In this case, a change in transmission parameter can be measured to estimate an approximate change in bit rate available for transmission. For example, when the number of PRBs in the transmission parameters of FIG. 5A becomes one half, since the band available for transmission is also estimated to be one half, the estimate of the communicable band can be changed without waiting for feedback from the reception device 200 side.

In Re Distribution of Packets

Based on the communicable band information obtained by the radio band estimation unit 208, the packet distribution unit 203 decides on the distribution of each packet according to the priority given to the packet. The sequence is as follows:

(1) Packets are distributed into the first interface in order from a certain level of priority or more. When the packets having the highest priority cannot be transmitted, an error-resistant measure (processing) such as FEC (Forward Error Correction) is taken to distribute the packets into the second interface. In other words, when transmitting data with a certain level of priority or more using the second interface instead of the first interface, the distribution unit performs error-resistant processing on data to be transmitted, such as to give an error correction to packets for the data, and outputs the packets to the second interface. Note that a countermeasure against error may also be taken within the second interface to further improve the radio situation.

(2) The remaining packets are distributed into the second interface in descending order of priority.

(3) Packets that cannot be allocated to both interfaces are discarded.

FIG. 7 shows an example of a flowchart representing a sequence of deciding on an interface as a distribution destination when the distribution unit receives certain packets. As shown in FIG. 7, in the transmission device 100, the priorities of the packets are checked (step S701) to determine whether the distribution of top-priority packets is completed (step S702). When it is not completed, it is then determined whether the packets are transmittable on the first interface (first communication unit, i.e., the radio 1 transmission unit in FIG. 2) (step S703). When possible, the packets are transmitted on the first interface (step S704). When the packets are not transmittable in step S703, an error correction is given to the packets (step S705), and the packets are transmitted on the second interface (second communication unit, i.e., the radio 2 transmission unit in FIG. 2) (step S706).

When the distribution is completed in step S702 (Yes in step S702), it is determined whether the distribution of packets with priority N is completed (step S707). When it is not completed, it is then determined whether the packets are transmittable on the first interface (step S708). When the packets are transmittable, the packets are transmitted on the first interface (step S709). When the packets are not transmittable in step S708, it is then determined whether the packets are transmittable on the second interface (step S710). When the packets are transmittable, the packets are transmitted on the second interface (step S711). When the packets are not transmittable, the packets are discarded (step S712). When the distribution is completed in step S707, 1 is added to N to perform processing in step S707.

FIG. 8 shows an example of allocation of packets in the present invention, where the packets are classified into three kinds of packets from priority 1 to priority 3. In case 1, all packets with priority 1 are allocated to the first interface (first radio unit), and all packets with priorities 2 and 3 are allocated to the second interface (second radio unit). In case 2, since all packets with priority 1 cannot be transmitted on the first interface, an error correction packet is added to some of the packets with priority 1 to allocate the packets to the second interface. In case 3, the communicable band of the second interface becomes narrow, and the packets with priorities 2 and 3 are discarded.

According to the aforementioned embodiment, the following effects can be expected: Since the communication parameters from the reception device 200 side can be transmitted to the radio band estimation unit 208 on the transmission device 100 side more quickly and more accurately compared to the case of using the second interface, response to changes in the radio situation becomes more quickly and the possibility of losing data essential for playback of video stream data is reduced, thereby improving the video quality upon playback of the video on the reception device 200 side. Particularly, breaking of the video can be prevented.

Second Embodiment

Even in an asymmetric network with a wider communicable band for downlink, the downlink on the reception device 200 side may be a bottleneck in communication depending on the communication situation. It can be estimated which is the bottleneck by comparing the communicable band estimated from the transmission parameters of the radio unit on the transmission device 100 side with the communicable band estimated from test packets actually received. Even in this case, the estimate of the band available for transmission can be changed by feeding back parameters acquired from the reception unit on the reception device 200 side without waiting for arrival of certain specific test packets.

Figure 9:
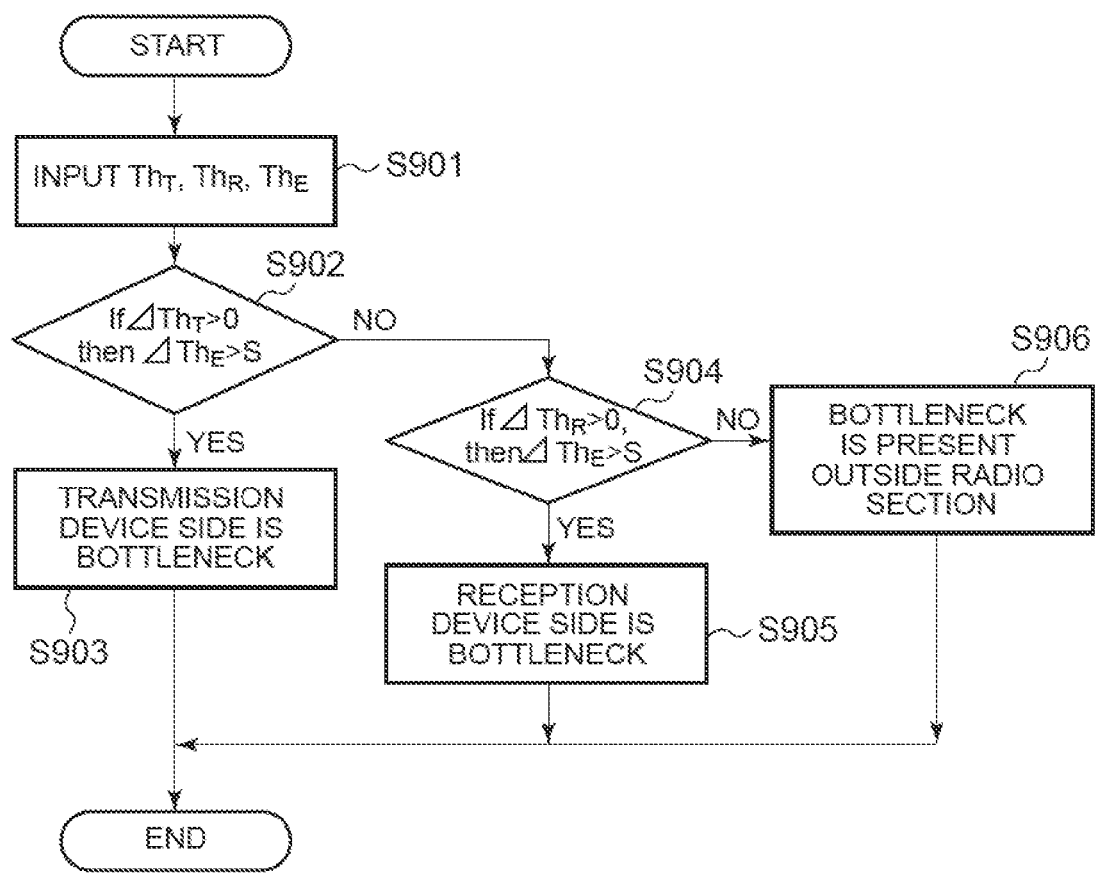
FIG. 9 is a flowchart for estimating a bottleneck in communication in an embodiment of the present invention.

A flowchart for estimating a bottleneck in communication on the transmission device side is shown in FIG. 9. Here, $Th_T$ denotes a communicable band estimated from radio parameters acquired on the transmission device 100 side, $Th_R$ denotes a communicable band estimated from radio parameters acquired on the reception device 200 side, and $Th_E$ denotes a communicable band estimated using test packets. As shown in FIG. 9, when $Th_T$, $Th_R$, and $Th_E$ are input (8901), it is determined whether the statement of if $\Delta Th_T > 0$, then $\Delta Th_E > S$ is satisfied (step S902). Here, $\Delta Th_T$ denotes the absolute value of a time fluctuation of $Th_T$. The same holds true for $\Delta Th_E$ and $\Delta Th_R$. Further, S denotes a fluctuation range with a significant difference defined by the user. When the statement of if $\Delta Th_T > 0$, then $\Delta Th_E > S$ is satisfied, it is estimated that the transmission device 100 side is the bottleneck (step S903). This is because the influence of the radio parameter fluctuation of the transmission device on the communicable band estimated from the test packets is considered to be great. On the other hand, when it is determined not to be satisfied in step S902, it is then determined whether the statement of if $\Delta Th_R > 0$, then $\Delta Th_E > S$ is satisfied (step S904). When it is satisfied, the reception device 200 side is estimated to be the bottleneck (step S905), while when it is not satisfied, it is estimated that there is a bottleneck outside the radio communication section (step S906).

When the radio transmission unit on the transmission device 100 side is determined to be the bottleneck, a band available for transmission may be estimated based on changes in communication parameters on the transmission device 100 side. On the other hand, when the radio transmission unit on the reception device 200 side is determined to be the bottleneck, a band available for transmission may be estimated based on changes in communication parameters on the reception device 200 side. In other words, the estimation unit compares the communication parameter acquired from the transmission device side with the communication parameters acquired from the reception device side to estimate a communicable band by using the communication parameters having a greater influence on the communicable band.

Here, the greater influence on the communicable band indicates whether the communicable band between the transmission device 100 and the reception device 200 varies significantly when the communication situation of the interface changes. For example, when there is a communicable band of 3 Mbps between the transmission device 100 and the reception device 200, the total communicable band remains at 3 Mbps even if the communicable band of the interface on the reception device side becomes one half. On the other hand, if the total communicable band changes into 1.5 Mbps when the communication band of the interface on the transmission device side becomes one half, it can be said that the interface on the transmission device side has a greater influence on the communicable band.

Third Embodiment

Further, even when the same radio system is made up of a highly reliable channel and a high-capacity channel, the present invention can also use the highly reliable channel as the first interface and the high-capacity channel as the second interface. For example, in a radio system composed of two or more channels like wireless LAN, when one of the channels can be occupied for control use, the same effects can be expected if the above control channel is used as the first interface of the present invention and the remaining channels as the second interface of the present invention.

The above-mentioned white space is not limited to TV white space. Specifically, for example, in a radio communication system using a frequency band from about 400 MHz to 6 GHz or less, when there is another radio communication system to which priority is given in the same band, the system concerned may be called "system using white space." Further, even when either the video receiving side or the video transmitting side uses a single radio communication system rather than the heterogeneous multi-radio network, each embodiment of the present invention can be applied. In such a case, a packet allocation unit performs allocation control using only information on the link using heterogeneous multiple radios (the video transmitting side or the video receiving side). Further, for example, when the video receiving side is connected by cable and it is obvious that the transmission side is a bottleneck, only the parameters on the transmission side may be used to allocate packets without receiving feedback of parameters from the receiver side.

While each of the aforementioned embodiments is described by taking a case where data transmitted and received is video data, the present invention is applicable to all kinds of data including video data when different levels of importance are assigned to packets that make up the data. For example, there are cases where different levels of importance are assigned to sound in a frequency range of human voices and any other frequency range in sound data, or where different levels of importance are assigned to points with large amounts of change and points without change in output data of a sensor network.

Fourth Embodiment

In a fourth embodiment, a method of specifying a path for the above-mentioned feedback (feedback path) will be described.

Method of Specifying Feedback Path

Figure 11:
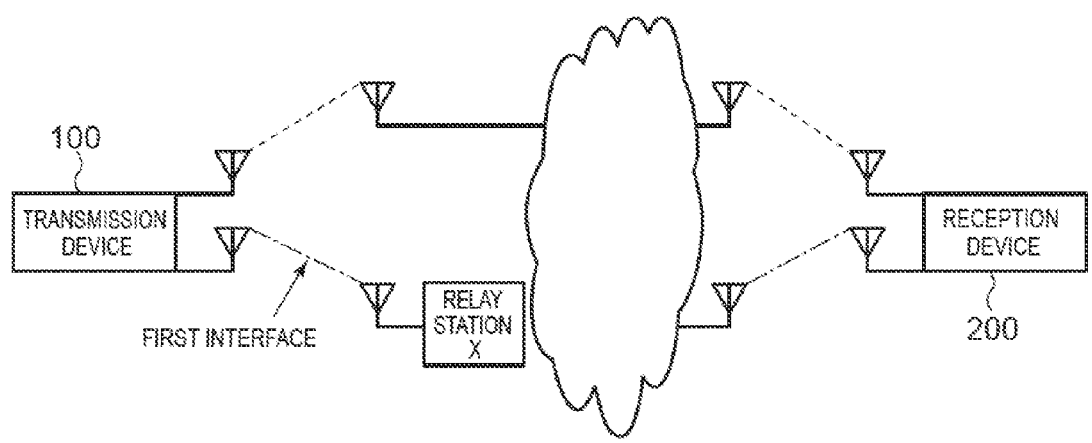
FIG. 11 is a diagram showing an example of the structure of a communication system according to the embodiments of the present invention.

Although it is easy for the transmission device to select the first interface and the second interface, a feedback path needs to be specified to transmit information to be fed back from the reception device to the transmission device through the first interface. As shown in FIG. 11, when the first interface is connected to an open network through an opposite relay station X (relay node X, which also called a relay point X), the address of the relay station X opposite to the first interface is so specified that feedback information can be transmitted using the first interface at all times.

Figure 12:
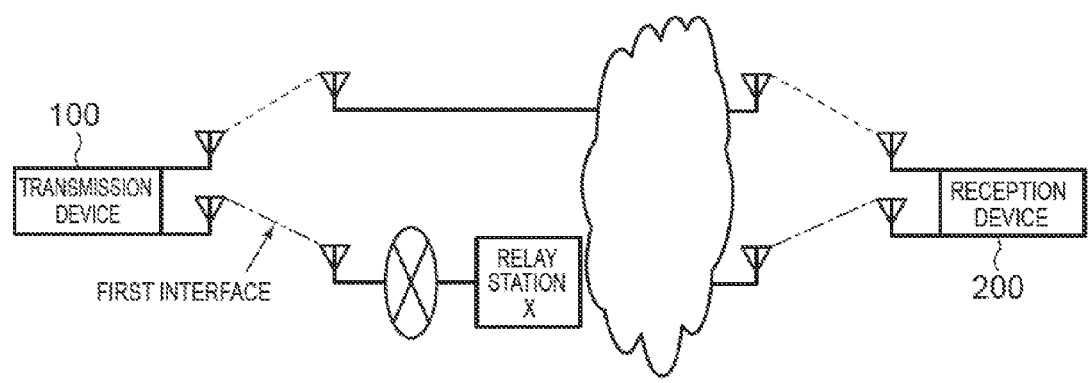
FIG. 12 is a diagram showing an example of the structure of another communication system in the embodiments of the present invention.

Further, as shown in FIG. 12, even when the first interface is contained in a closed network and the address of the transmission device is out of the immediate sight of the reception device, the address of the relay station X connected to a foreign network in this closed network is so specified that the feedback information can be transmitted using the first interface at all times.

As the first step for specifying a feedback path, the transmission device acquires the address of the above relay station X. When the first interface is connected to the open network through the opposite relay station X, the transmission device may be able to acquire the address directly from the relay station X.

The address of the relay station X in the case where the first interface is contained in the closed network can be acquired by making an inquiry to a network administrator, not shown. However, in this case, if two or more relay stations X are set up, it cannot be specified which of the addresses of the two or more relay stations X set up in routing between the transmission device and the reception device is used.

Figure 18:
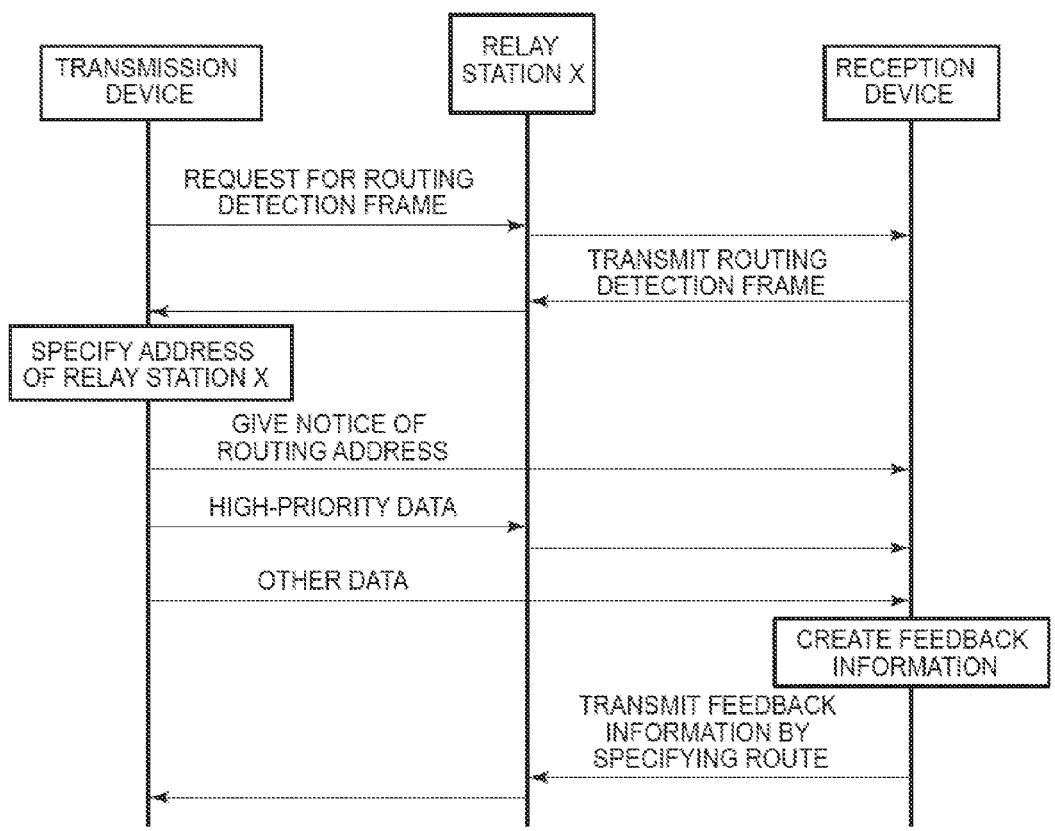
FIG. 18 is a sequence chart showing an example of a feedback information transmission sequence in the embodiment of the present invention.
Figure 19:
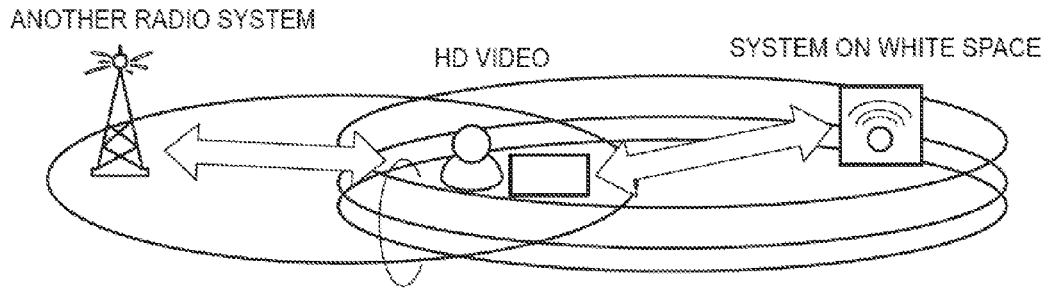
FIG. 19 is a diagram for describing prior art of the present invention.

An example of specifying an actually used IP address of a relay station X in such a situation is shown below. As shown in FIG. 18, the transmission device makes a request to the reception device for a routing detection frame in the situation of using only the first interface. The reception device receiving the request transmits the routing detection frame toward the transmission device. As one example of the routing detection frame, a Record Route option in the internet protocol defined in RFC791 is used. In other words, the feedback receiving unit receives a routing information detection frame (corresponding to the routing detection frame) including a packet having the function of recording address information on relay points to pass through, which is transmitted from the reception device to acquire routing information.

Figure 13:
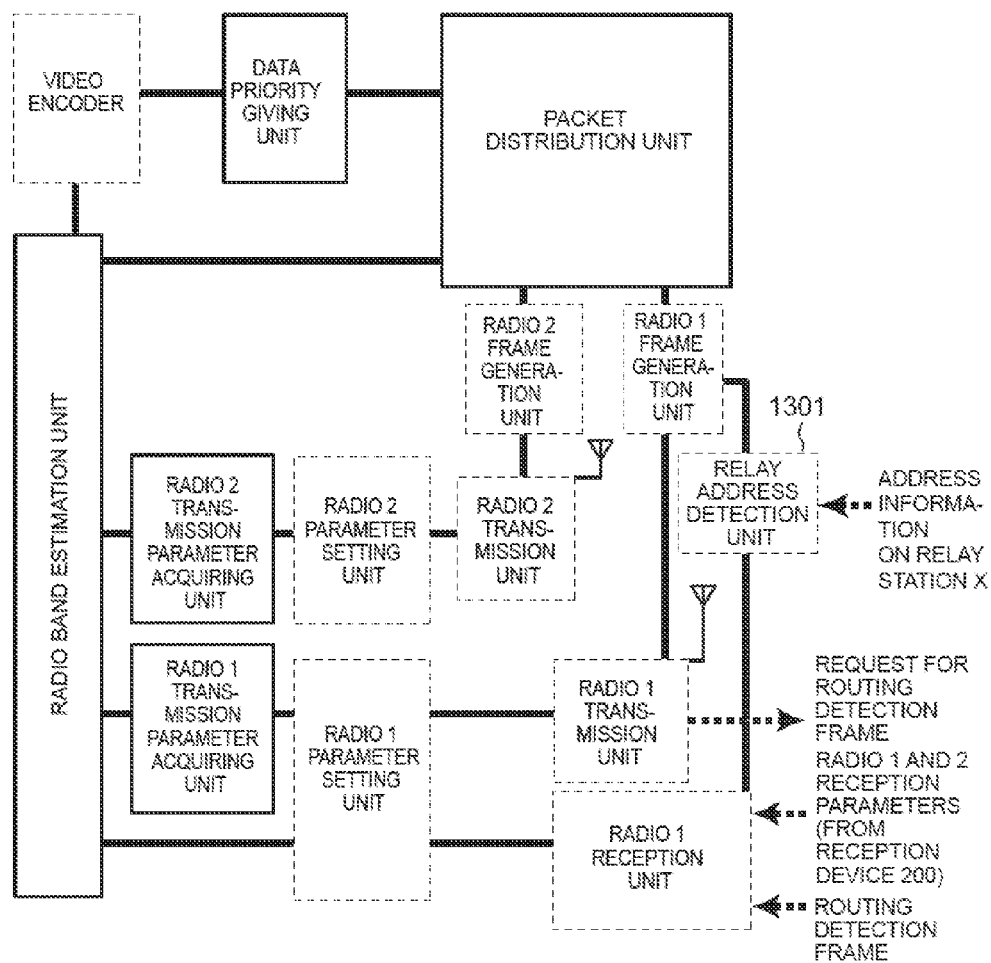
FIG. 13 is a block diagram showing an example of the structure of a transmission device according to an embodiment of the present invention.
Figures 14, 15:
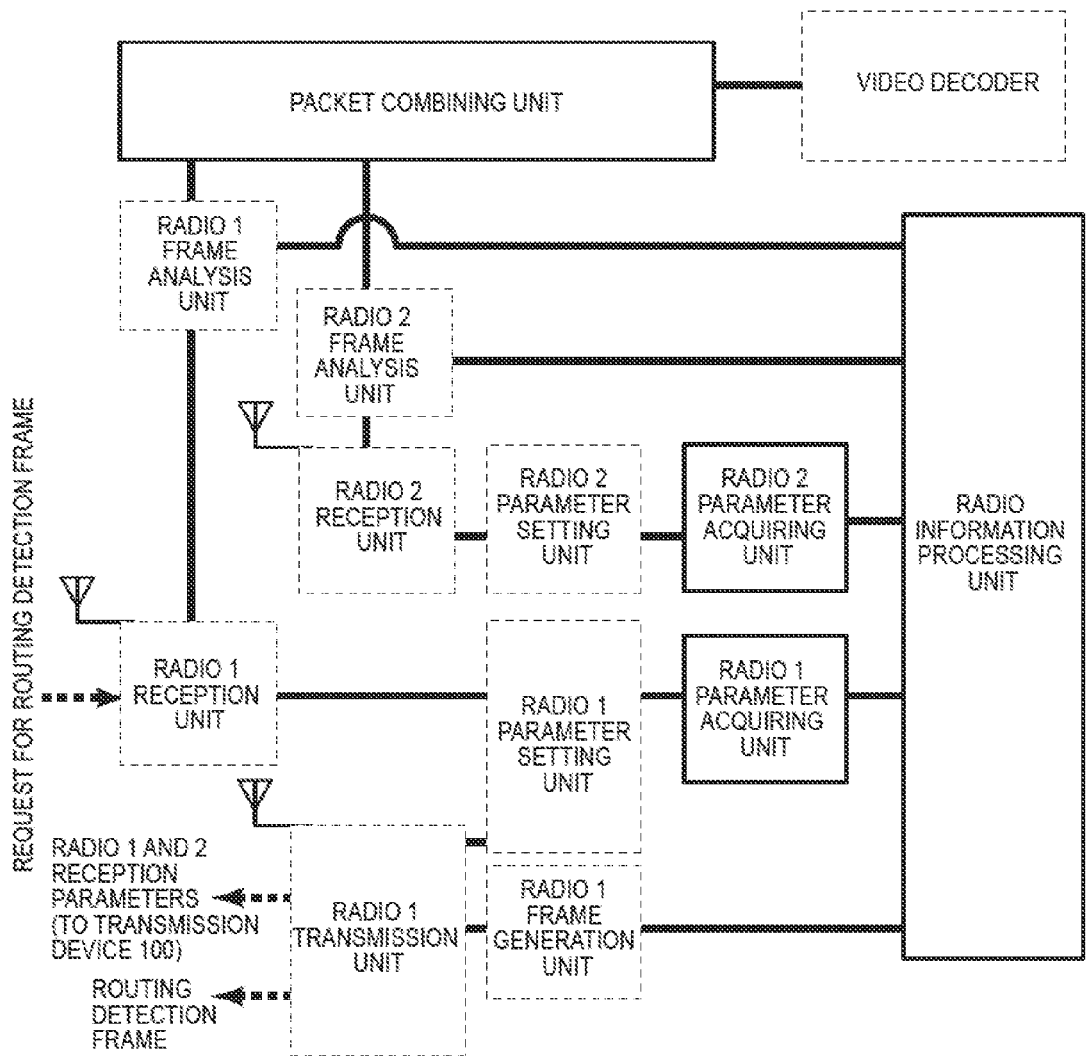
FIG. 14 is a block diagram showing an example of the structure of a reception device according to the embodiment of the present invention.
FIG. 15 is a diagram showing an IP packet to which a Record Route option is applied in the embodiment of the present invention.

An example of the structure of the transmission device according to the fourth embodiment is shown in FIG. 13 and an example of the structure of the reception device is shown in FIG. 14, respectively. As shown in FIG. 13, the feature of the transmission device according to the fourth embodiment is a relay address detection unit 1301. The relay address detection unit 1301 identifies the IP address of a relay station X based on the routing detection frame received through the radio 1 reception unit in response to the request for the routing detection frame transmitted via the radio 1 transmission unit, and address information on relay points (address information on relay points connectable to the first interface) acquired beforehand. In other words, there is further included an identification unit for comparing the routing information between the transmission device and the reception device with the address information on the relay points between transmission device and the reception device, which is acquired beforehand as being connectable to the first interface, to identify an address of a relay point used by the first interface. Information on the address of the relay point identified is transmitted to the reception device so that the transmission unit will have the reception device specify the identified address of the relay point as a via point and transmit feedback information to the transmission device through the first interface.

Further, as shown in FIG. 14, the reception device according to the fourth embodiment receives the request for the routing detection frame transmitted from the transmission device through the radio 1 reception unit, and transmits the routing detection frame, acquired based on the received request for the routing detection frame, to the transmission device through the radio 1 transmission unit. Since the other units of the transmission device and the reception device according to the fourth embodiment are the same as those described in the first embodiment, redundant description thereof will be omitted.

As shown in FIG. 15, a protocol used here defines such a scheme that, when reaching a relay point, its IP address (of its node) is recorded in a data area and the address is forwarded to the next relay point, and when reaching the final target address, the addresses of the relay stations passed through by then are recorded in the data area in due order.

Figures 16, 17:
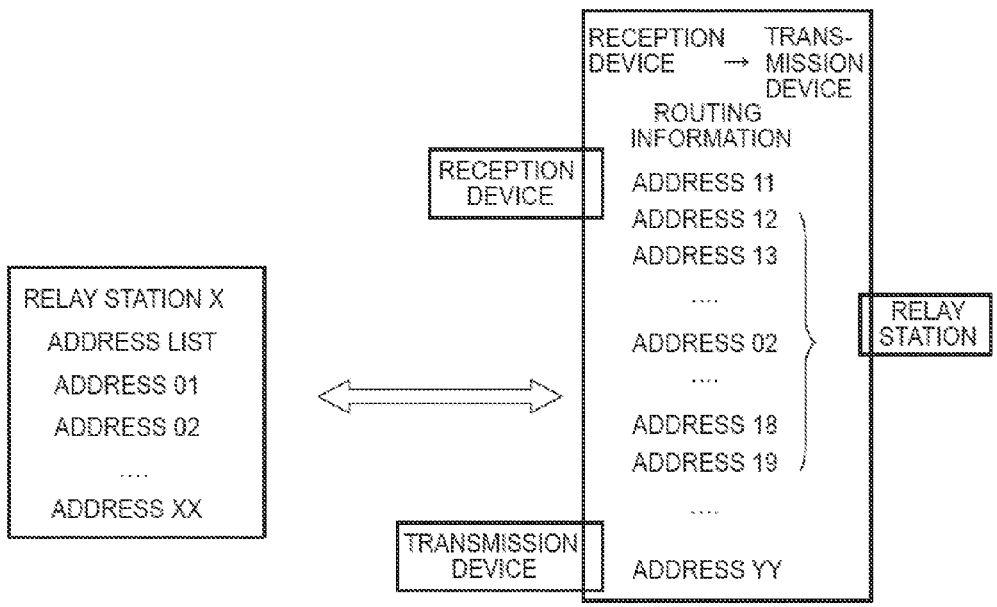
FIG. 16 is a diagram for describing a method of specifying a relay station in the embodiment of the present invention.
FIG. 17 is a diagram showing an example of an IP packet to which an LSRR option is applied in the embodiment of the present invention.

All data using the first interface are routed through any of the IP addresses of the relay stations X without exception. Therefore, using the relay address detection unit 1301 shown in FIG. 13, the recorded address group is compared with the address group of the relay stations X to identify the address of a relay station X being actually used. An example of an address identification method for a relay station X is shown in FIG. 16. For example, the address group of relay stations X are acquired beforehand as network configuration information.

After that, address information on the identified relay station X is notified to the reception device. Either the first interface or the second interface may be used to give notice of this address information. When there arises a need to feed back network information from the reception device during communication using multiple interfaces, the feedback information is transmitted to the transmission device on condition of routing the IP address of the relay station X.

In this case, as one of methods of specifying the address of a relay station X, a Loose Source and Record Relay station (LSRR) option defined in RFC791 is used. As shown in FIG. 17, when this LSRR option is applied to an IP packet including the feedback information, the IP address of the relay station X notified from the transmission device is set to pass through before the IP address contained by the transmission device so that the feedback information will be transmitted to the transmission device using the first interface via the relay station X at all times. In the fourth embodiment, the transmission of the feedback information to the transmission device via the first interface is realized by a sequence shown in FIG. 18.

When routing information is acquired, information on a lower layer or the like may be used to identify and use routing information received via the first interface. Further, when routing information from the reception device to the transmission device is acquired, the reception device individually acquires address information on relay stations on the route (for example, if Trace Route defined in RFC1393 is used, address information on relay stations on the route can be acquired) in the form of a list, and transmits the list to the transmission device. This can carry out the present invention effectively even in a network with a large hop count. In other words, the feedback receiving unit receives, from the reception device, routing information to be acquired by transmitting a frame including packets for detecting the addresses of relay points. Further, in the fourth embodiment, the address information on a relay station X is identified on the transmission device side, but the address information on a relay station may be transmitted from the transmission device to the reception device so that the reception device side will identify the address information.

The above describes each of the aforementioned embodiments of the present invention.

Each functional block used in the explanation of each of the aforementioned embodiments can be realized as an LSI (Large Scale Integration) that is typically an integrated circuit. Each functional block can be individually formed into a single chip, or some or all of the functional blocks can be included and formed into a single chip. Although referred to here as the LSI, the integrated circuit may be referred to as an IC (Integrated Circuit), a system LSI, a super LSI, or an ultra LSI depending on differences in integration. The method of forming the integrated circuit is not limited to LSI and can be actualized by a dedicated circuit or a general-purpose processor. An FPGA (Field Programmable Gate Array) that can be programmed after LSI manufacturing or a reconfigurable processor of which connections and settings of the circuit cells within the LSI can be reconfigured may be used. Further, if a technology for forming the integrated circuit that can replace LSI is introduced as a result of the advancement of semiconductor technology or a different derivative technology, the integration of the functional blocks can naturally be performed using the technology. For example, the application of biotechnology is a possibility.

INDUSTRIAL APPLICABILITY

Since the transmission data processing method, the information processing method, the transmission device, and the reception device of the present invention can estimate a communicable band in a heterogeneous multi-radio network at a higher speed and reduce the deterioration of the video quality even if an unavoidable fluctuation occurs in the communicable band, the present invention is useful for a transmission data processing method, an information processing method, a transmission device, a reception device, and the like when data is transmitted and received using a network in which the available band is restricted.

The invention claimed is:

1. A transmission device for providing data transmission to a reception device as a communication partner, comprising:

a radio communication unit composed of a first interface and a second interface used for communication with the reception device;

a transmission unit for using the radio communication unit to transmit multiple pieces of data to the reception device;

a priority giving unit for giving priority based on a predetermined criterion to each piece of the data to be transmitted to the reception device through the transmission unit;

a feedback receiving unit for receiving, from the reception device, feedback information on data transmitted from the transmission device to the reception device;

a distribution unit for distributing the multiple pieces of data, to be transmitted through the transmission unit, into the first interface and the second interface based on the priority and the feedback information received; and an identification unit for comparing information on routing between the transmission device and the reception device with address information on relay points between the transmission device and the reception device, where the relay points are acquired beforehand as being connectable to the first interface, to identify an address of a relay point used by the first interface, wherein the transmission unit transmits information on the identified address of the relay point to the reception device to have the reception device specify the identified address of the relay point as a via point and transmit feedback information to the transmission device through the first interface.

2. The transmission device according to claim 1, wherein the feedback receiving unit receives a routing information detection frame including a packet having a function to record address information on a relay point to pass through, where the routing information detection frame is transmitted from the reception device, to acquire information on the routing.

3. The transmission device according to claim 1, wherein the feedback receiving unit receives, from the reception device, information on the routing acquired by transmitting a frame including a packet for detecting the address of the relay point.

* * * * *